(12) United States Patent
Sato et al.

(10) Patent No.: US 7,136,662 B2
(45) Date of Patent: Nov. 14, 2006

(54) WIRELESS BASE STATION, METHOD OF SELECTING WIRELESS BASE STATION, METHOD OF MULTICASTING, AND WIRELESS TERMINAL

(75) Inventors: Hijin Sato, Yokohama (JP); Narumi Umeda, Yokohama (JP); Toshiaki Takao, Yokohama (JP); Kobaruto Shimada, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 494 days.

(21) Appl. No.: 09/926,258

(22) PCT Filed: Feb. 2, 2001

(86) PCT No.: PCT/JP01/00748

§ 371 (c)(1),
(2), (4) Date: Jan. 29, 2002

(87) PCT Pub. No.: WO01/58053

PCT Pub. Date: Aug. 9, 2001

(65) Prior Publication Data
US 2003/0157966 A1   Aug. 21, 2003

(30) Foreign Application Priority Data
Feb. 2, 2000  (JP) ............. 2000-025767
Feb. 2, 2000  (JP) ............. 2000-025768

(51) Int. Cl.
H04B 15/00  (2006.01)
H04B 7/005  (2006.01)
H04B 7/01   (2006.01)
H04B 7/015  (2006.01)

(52) U.S. Cl. .......... 455/503; 455/561; 455/506; 455/518; 455/522; 455/524

(58) Field of Classification Search ............ 455/503, 455/506, 561, 518–522, 444, 519, 520, 521, 455/500, 501, 502, 504, 507, 899
See application file for complete search history.

(56) References Cited

U.S. PATENT DOCUMENTS 5,920,818 A * 7/1999 Frodigh et al. ............. 455/443
5,982,762 A   11/1999 Anzai et al.

(Continued)

FOREIGN PATENT DOCUMENTS

EP    0 820 204 A2    1/1998

(Continued)

Primary Examiner—Nay Maung
Assistant Examiner—Shaima Q. Aminzay
(74) Attorney, Agent, or Firm—Oblon, Spivak, McClelland, Maier & Neustadt, P.C.

(57) ABSTRACT

One preferred embodiment of the invention provides a wireless base station which provides a multicasting service to simultaneously transmit identical data to a plurality of wireless terminals. A wireless base station is connected to a plurality of wireless terminals and provides a multicasting service for a plurality of wireless terminals. The wireless base station determines autonomously whether it provides the multicasting service for the plurality of wireless terminals. Another preferred embodiment of the invention provides a method of selecting a wireless base station for a wireless terminal, the wireless base station providing a multicasting service for the wireless terminal. When the wireless terminal can receive the same multicasting information from a plurality of wireless base stations, the wireless terminal selects one of the plurality of wireless base stations so as to make the number of the wireless base stations that send the same multicasting information as small as possible.

17 Claims, 20 Drawing Sheets

U.S. PATENT DOCUMENTS

| | | | |
|---|---|---|---|
| 5,983,107 A | 11/1999 | Hayashi et al. | |
| 6,298,058 B1 * | 10/2001 | Maher et al. | 370/390 |
| 6,434,396 B1 * | 8/2002 | Rune | 455/502 |
| 6,480,721 B1 * | 11/2002 | Sydon et al. | 455/464 |
| 6,625,442 B1 * | 9/2003 | Kojima | 455/414.1 |

FOREIGN PATENT DOCUMENTS

| | | |
|---|---|---|
| EP | 0 828 355 A2 | 3/1998 |
| EP | 0 863 684 | 9/1998 |
| JP | 8-265358 | 10/1996 |
| JP | 9-163427 | 6/1997 |
| JP | 9-284829 | 10/1997 |
| JP | 10-145369 | 5/1998 |
| JP | 10-191442 | 7/1998 |
| JP | 10-257567 | 9/1998 |
| WO | WO 00/04666 | 1/2000 |

* cited by examiner

FIG. 5
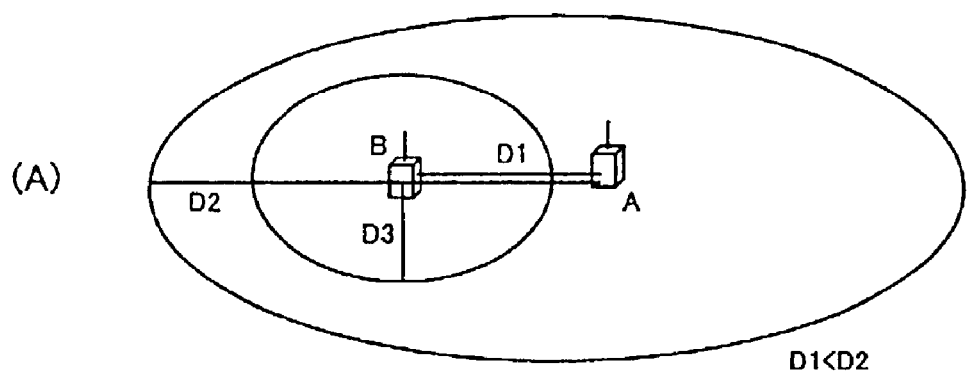
(A)
D1<D2
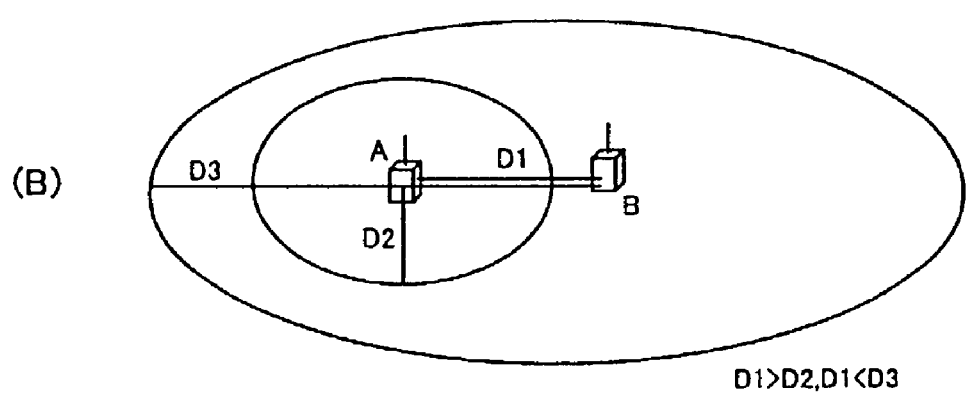
(B)
D1>D2,D1<D3
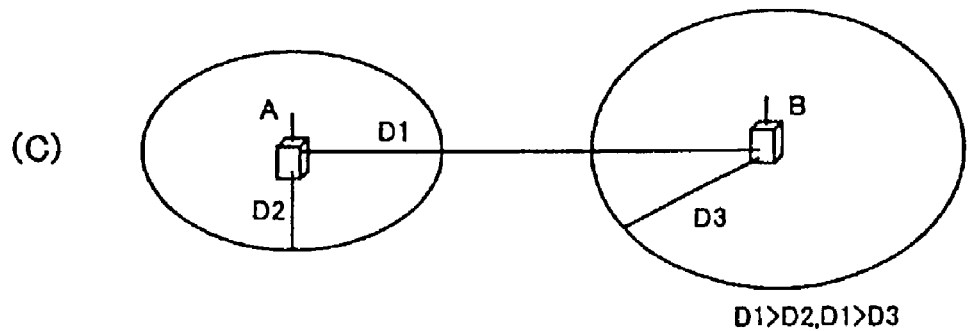
(C)
D1>D2,D1>D3

WIRELESS BASE STATION, METHOD OF SELECTING WIRELESS BASE STATION, METHOD OF MULTICASTING, AND WIRELESS TERMINAL

FIELD OF THE INVENTION

The present invention relates to a wireless base station which provides a multicasting service to simultaneously send identical data to a plurality of wireless terminals, and relates to a method of selecting a wireless base station, a method of transmitting a multicast signal, and a wireless terminal.

BACKGROUND OF THE INVENTION

Generally, in a wireless communication system, a number of wireless base stations have respective service areas to which the service of each base station is provided, and the service areas of the wireless base stations are overlapped each other.

In the IP (Internet protocol) network, there is an increasing demand for broadcasting communication applications, such as music or vide distributions. The studies of the protocols suitable for such applications in the IP network have been carried out. Hence, the wireless access communication system that supports the multicasting service is the important issue.

Multicasting is the ability of one network node (for example, a wireless base station) to send identical data to a number of end-point terminals (for example, wireless terminals). However, the service areas of wireless base stations are not necessarily appropriate for providing the wireless terminals with the multicasting services.

For example, it is often possible that multiple wireless base stations cover the same service area, in order to avoid network congestion.

FIG. 1 is a diagram for explaining a problem of a service area of a conventional wireless base station. In the example of FIG. 1, small service areas 3 through 6 are provided within a larger service area 1, and small service areas 7 through 9 are provided within a large service area 2.

FIG. 2 is an enlarged view of the large service area 1 of the conventional wireless base station in FIG. 1. As shown, in the large service area 1, a wireless base station B stands ready to provide its service. In the small service area 3, a wireless base station A stands ready to provide its service.

In the example of FIG. 2, a wireless terminal "a" exists in the service area 3, and a wireless terminal "b" exists in the service area 1. Each of the wireless base stations A and B provides the multicasting service. In the present example, the wireless terminal "a" can receive the multicasting service provided by the wireless base station A, and the wireless terminal "b" can receive the multicasting service provided by the wireless base station B.

When providing the multicasting service in a wireless access communication system in which the service areas of plural wireless base stations overlap each other, it is likely that the plural wireless base stations simultaneously send identical data to the overlapping service area. For the example of FIG. 2, in such a case, the wireless terminal "a" receives the multicasting service from the wireless base station A, and, at the same time, it receives the multicasting service from the wireless base station B. Namely, the wireless terminal "a" receives identical data from both the wireless base station A and the wireless base station B at the same time.

In the present example, it is sufficient for the wireless terminal "a" to receive the multicasting service from the wireless base station B only. It is not necessary that the wireless terminal "a" receive the multicasting service from the wireless base station A.

Hence, in the present example, the multicasting service provided to the wireless terminal "a" by the wireless base station A is inefficient. The radio resources are utilized inefficiently in the present example, and the efficiency of utilization of the radio resources is lowered.

Further, conventionally, when the services supported by the wireless base stations have to be changed in the individual base stations, the scheduling of the service changes of the wireless base stations is produced at another location other than the wireless base stations, and the service changes are effected at the respective base stations. Such conventional method requires high cost from the standpoint of maintenance and operation.

In order to eliminate the above-mentioned problems, one object of the present invention is to make efficient use of the radio resources and lower the maintenance and operation cost.

Further, when the access communication network is based on the IP network, the IGMP (Internet Group Management Protocol) can be used as the multicasting protocol. According to the IGMP protocol, it is determined whether the router sends the multicasting messages to the sub-network, in order to avoid the network congestion. When the access communication system is connected to the IP network that supports the IGMP protocol, it is preferred that the system employs the access control flow that is compatible with the IGMP protocol.

According to the IGMP protocol, in order to prevent the sending of unnecessary data to the sub-network, the multicasting is not performed for the packets having a group address that is not related to the sub-network. In addition, for the wireless access system that supports the multicasting, the sending of unnecessary data to the sub-network is avoided, and the radio resources are saved.

However, when two different routers A and B receive the packets having a same group address, the routers A and B perform the multicasting to send identical data to the terminals of the related group within the respective service areas thereof In a wireless access communication system in which the service areas of plural wireless base stations overlap each other and some wireless terminal can simultaneously receive the multicasting services from the plural wireless base stations, it is likely that the wireless terminal is connected to the wireless base station that provides the highest level of communication quality for the wireless terminal.

FIG. 3 is a diagram for explaining another problem of a service area of a conventional wireless base station. As shown, reference numeral 1 denotes the service area of the wireless base station A, and reference numeral 2 denotes the service area of the wireless base station B.

As indicated in (A) in FIG. 3, the wireless terminal "a" is connected to the wireless base station A, and the wireless terminal "b" can be connected to both the wireless base station A and the wireless base station B. However, the wireless terminal "b" is located at the place that is nearer to the wireless base station B than the wireless base station A. As the wireless base station B provides a higher level of communication quality for the wireless terminal "b", the wireless terminal "b" is connected to the wireless base station B and receives the service from the wireless base station B.

As indicated in (B) in FIG. 3, when the service area 4 of the wireless base station A is provided within the service area 3 of the wireless base station B, the wireless terminal "a" can be connected to both the wireless base station A and the wireless base station B. In the example of FIG. 3(B), the wireless base station A provides a higher level of communication quality for the wireless terminal "a" than the wireless base station B, and the wireless terminal "a" is connected to the wireless base station A and receives the service from the wireless base station A.

However, conventionally, in the example of FIG. 3(A), the wireless terminal "a" is connected to the wireless base station A according to the communication quality level, even when the wireless terminals "a" and "b" belong to the same IGMP group (group G1) and receive identical data. The wireless base station A sends to the wireless terminal "a" the identical data that is the same as that is sent to the wireless terminal "b".

If the connection of the wireless terminal "b" and the wireless base station B is switched to the connection of the wireless terminal "b" and the wireless base station A when the wireless terminal "b" is the only terminal that belongs to the group G1 and exists in the service area 2 of the wireless base station B, the wireless base station B stops providing the multicasting service to the wireless terminal "b". The radio resources needed for the wireless base station B to transmit other services to the group G1 terminals can be saved because of the disconnection of the wireless terminal "b" from the wireless base station B.

Further, in the example of FIG. 3(B), the wireless terminal "a" exists in the service area 3 of the wireless base station B, and the wireless terminal "a" can communicate with the wireless base station B as well. If the connection of the wireless terminal "a" and the wireless base station A is switched to the connection of the wireless terminal "a" and the wireless base station B, the radio resources needed for the wireless base station A can be saved.

In a conventional IGMP network, it is likely that, when different wireless base stations provide the multicasting service for the wireless terminals which belong to the same IGMP group and exist in the overlapping service area, the wireless base stations send identical data to the wireless terminals at the same time. The radio resources are used unnecessarily in such a situation, and the utilization of the radio resources is lowered.

In order to eliminate the above-mentioned problems, another object of the present invention is to reduce the number of the wireless base stations that send identical data to the wireless terminals and increase the efficiency of utilization of the radio resources.

SUMMARY OF THE INVENTION

In order to achieve the above-described objects, one preferred embodiment of the present invention provides a wireless base station which is connected to a plurality of wireless terminals and provides a multicasting service for the plurality of wireless terminals, the wireless base station determining autonomously whether the wireless base station provides the multicasting service for the plurality of wireless terminals. In the preferred embodiment, the determination as to whether the wireless base station provides the multicasting service may be made for each of a plurality of multicasting service groups. The determination as to whether the wireless base station provides the multicasting service may be made based on a magnitude of a service area in which the wireless base station can provide the multicasting service for the plurality of wireless terminals. The determination as to whether the wireless base station provides the multicasting service may be made based on whether the wireless base station has an overlapping service area. The determination as to whether the wireless base station provides the multicasting service may be made based on a service state of a neighboring wireless base station. Each of the wireless terminals which are connected to the neighboring wireless base station may send a state signal indicating the service state of the neighboring wireless base station. The determination as to whether the wireless base station provides the multicasting service may be made based on a hop number of the wireless base station.

Further, in order to achieve the above-described objects, another preferred embodiment of the present invention provides a method of selecting a wireless base station for a wireless terminal, the wireless base station providing a multicasting service for the wireless terminal, wherein, when the wireless terminal can receive same multicasting information from a plurality of wireless base stations, the wireless terminal selects one of the plurality of wireless base stations so as to make the number of the wireless base stations that send the same multicasting information as small as possible. In the preferred embodiment, when there is a first wireless base station which is connectable to the wireless terminal and sending the same multicasting information to the wireless terminal, the wireless terminal selects the first wireless base station and is connected to the first wireless base station. When there are a plurality of first wireless base stations which are connectable to the wireless terminal and sending the same multicasting information to the wireless terminal, the wireless terminal selects one of the plurality of first wireless base stations such that the selected first wireless base station has a largest number of wireless terminals connected thereto, and the wireless terminal being connected to the selected first wireless base station.

BRIEF DESCRIPTION OF THE DRAWINGS

Other objects, features and advantages of the present invention will become apparent from the following detailed description when read in conjunction with the accompanying drawings.

FIG. 5 is a diagram for explaining detection of an overlapping service area by the wireless base station of the present embodiment.

FIG. 111 is a block diagram of the wireless base station in the first preferred embodiment of the invention.

DETAILED DESCRIPTION OF PREFERRED EMBODIMENTS

A description will now be provided of preferred embodiments of the present invention with reference to the accompanying drawings.

Figure 1:
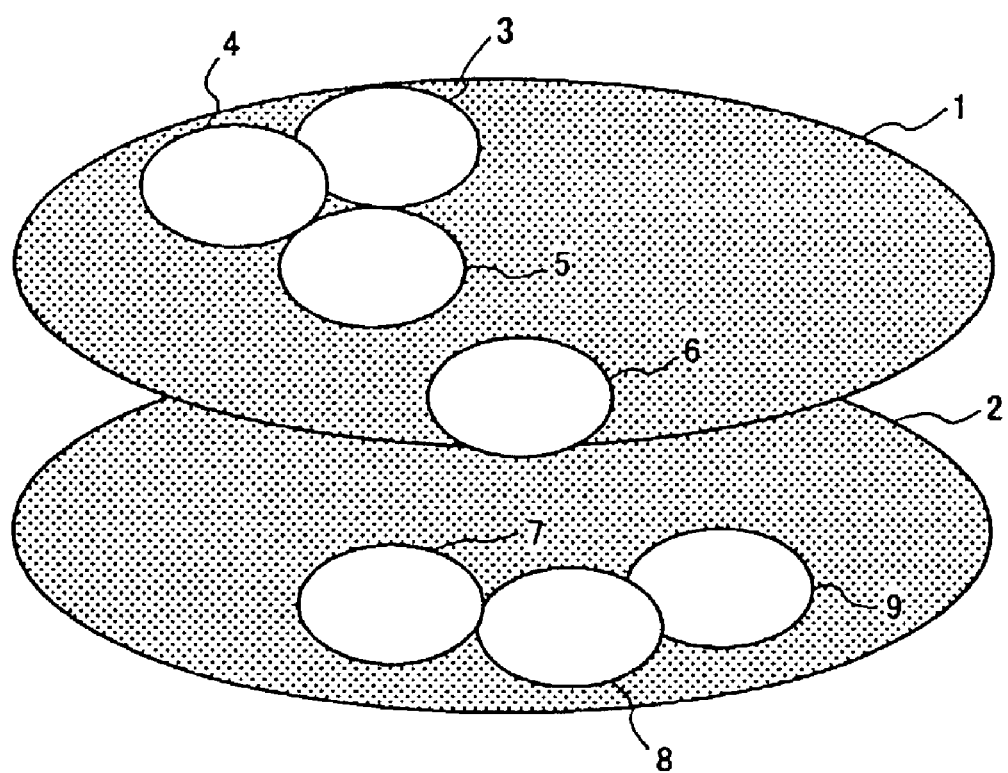
FIG. 1 is a diagram for explaining a problem of a service area of a conventional wireless base station.
Figure 2:
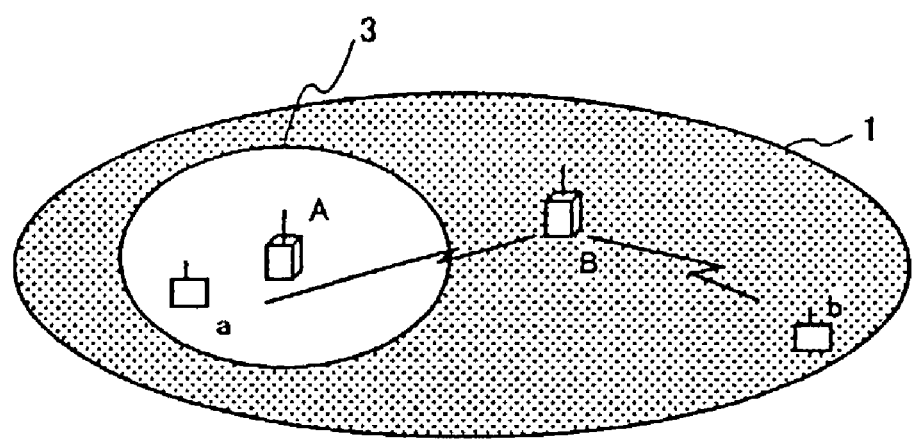
FIG. 2 is an enlarged view of the service area of the conventional wireless base station in FIG. 1.
Figure 3:
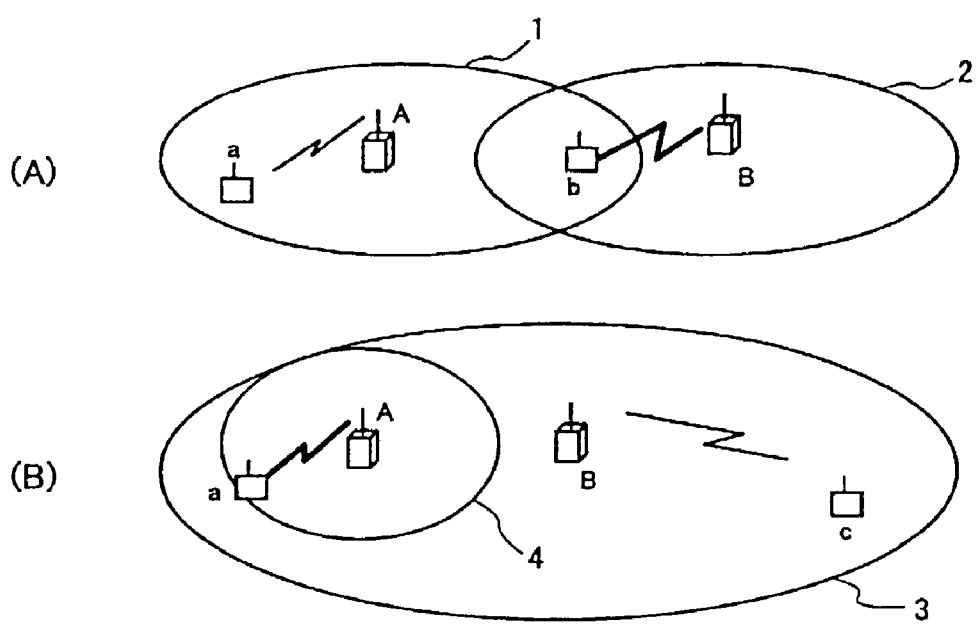
FIG. 3 is a diagram for explaining another problem of a service area of a conventional wireless base station.
Figure 4:
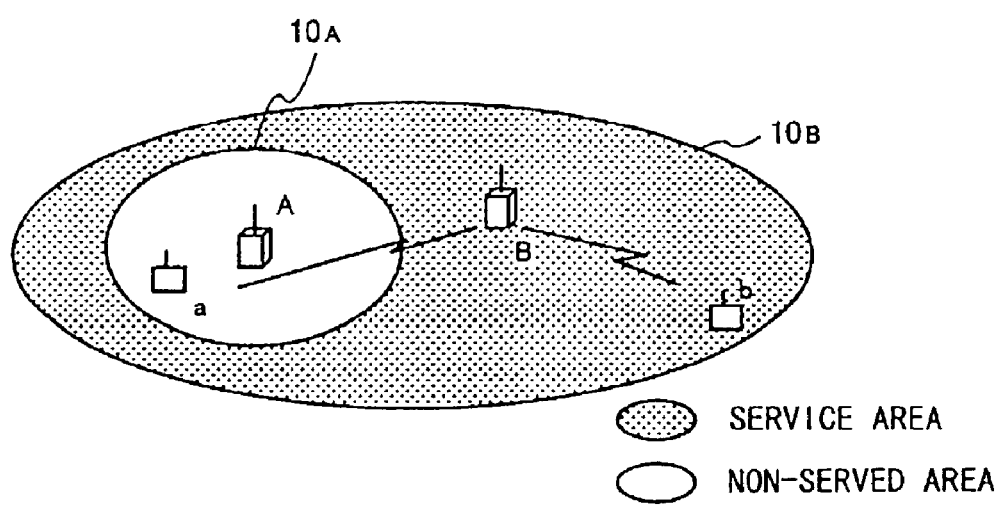
FIG. 4 is a diagram for explaining a service area of one preferred embodiment of the wireless base station of the invention.

FIG. 4 shows a service area of one preferred embodiment of the wireless base station of the invention.

In the present embodiment, as shown in FIG. 4, a service area $10_A$ of a wireless base station A is provided within a service area $10_B$ of a wireless base station B. A wireless terminal "a" exists in the service area $10_A$, and a wireless terminal "b" exists in the service area $10_B$. Each of the wireless base stations A and B stands ready to provide the multicasting service.

A plurality of wireless terminals may exist in the service area $10_A$ or the service area $10_B$. However, the wireless terminal "a" and the wireless terminal "b" are shown as the representative one of the plural wireless terminals in each service area, for the sake of convenience.

In the present example of FIG. 4, the wireless terminal "a" can receive the multicasting service provided by the base station A and the multicasting service provided by the base station B. The wireless terminal "b" can receive the multicasting service provided by the base station B.

As is apparent from the example of FIG. 4, the wireless terminal "a" which is located within the overlapping service area $10_A$ can receive the multicasting service from the base station B as well. In the present embodiment, when the wireless base stations A and B send the same multicasting information, the wireless base stations A and B are controlled such that the base station A does not provide the multicasting service for the service area $10_A$, and only the base station B provides the multicasting service for the service area $10_B$. According to the present embodiment, the radio resources of the wireless base station A can be allocated to other services than the multicasting service. Hence, it is possible that the wireless base station of the present embodiment make efficient use of the radio resources.

Generally, in order to make efficient use of the radio resources, the triggers that are needed for the wireless base station to determine autonomously whether it provides the multicasting service are as follows:

1) the magnitude of the service area,
2) the presence of the overlapping service area,
3) the service states of the neighboring wireless base stations.

A description will now be given of the method of determining whether the wireless base station provides the multicasting service, based on the magnitude of the service area.

The magnitude of the service area depends on a transmission power of the wireless base station. One of a plurality of levels of the service area magnitude can be determined, in advance, for the individual wireless base stations in accordance with their transmission powers. Only the wireless base stations having a given level of the service area magnitude are allocated to those providing the multicasting service.

For example, suppose that wireless base stations having a radius of the service area less than 100 meters are set to level 1, wireless base stations having a radius of the service area ranging from 100 meters to 200 meters are set to level 2, and wireless base stations having a radius of the service area larger than 200 meters are set to level 3. For the present case, it can be readily understood that, according to the present embodiment, the wireless base stations of level 1 and level 3 are arranged in a spot-like coverage, and the wireless base stations of level 2 are arranged in a wide-range coverage. In the above case, the wireless base stations to which the wireless terminals are most likely to be connected in the entire service area are the level-2 wireless base stations. In such circumstances, the multicasting service is provided by the level-2 wireless base stations only.

Hence, when the setting of the service area magnitude levels is given, each wireless base station can determine autonomously whether it provides the multicasting service, based on the magnitude of the service area of the wireless base station. The magnitude of the service area is derived from the transmission power of the wireless base station. For example, when the level-2 wireless base stations are predetermined as providing multicasting service, it can be autonomously determined that the wireless base stations having the transmission power corresponding to the level-2 are those providing the multicasting service.

Alternatively, the wireless base stations with two or more levels (for example, the wireless base stations of level 1 and level 2 or the wireless base stations of level 2 and level 3) may be predetermined as providing multicasting service.

Next, a description will be provided of the method of determining whether the wireless base station provides the multicasting service, based on the presence of the overlapping service area, with reference to FIG. 5.

FIG. 5 shows a detection of an overlapping service area by the wireless base station of the present embodiment.

As shown in FIG. 5, the presence of the overlapping service area is detected by the wireless base station A based on the radius D2 of the service area of the wireless base station A (derived from a transmission power of the base station A), the receiving power R1 of a certain channel related to the neighboring wireless base station B, and the transmission power T1 of the neighboring base station B.

The distance D1 between the base station A and the base station B is calculated from the transmission power T1 and the receiving power R1.

The service area radius D2 and the distance D1 are compared each other. When D1<D2 (the case indicated in (A) in FIG. 5), the base station A detects that the service area of the neighboring base station B is provided within the service area of the base station A, and it is the overlapping area. In this case, the base station A determines that it provides the multicasting service for the overlapping service area.

When D1>D2, there are two different cases (the case indicated in (B) in FIG. 5 and the case indicated in (C) in FIG. 5). The radius D3 of the service area of the neighboring base station B is calculated from the transmission power T1 of the base station B. Then, the distance D1 and the service area radius D3 are also compared each other.

When D1>D3 (the case indicated in (C) in FIG. 5), there is no overlapping service area. In this case, the base station A determines that it provides the multicasting service for the service area of the base station A. On the other hand, when D1<D3 (the case indicated in (B) in FIG. 5), the base station A detects that the service area of the base station A is provided within the service area of the neighboring base station B, and it is the overlapping service area. In this case, the base station A determines that it does not provide the multicasting service for the service area of the base station A.

Next, a description will be given of the relationship between the multicasting service and the service area.

In the case indicated in (A) in FIG. 5, the service area of the base station A is inclusive of the service area of the neighboring base station B. If the base station A provides the multicasting service for the service area of the base station A, the neighboring base station B is not required to provide the multicasting service for the service area of the base station B. However, a wireless base station having a small service area generally can easily increase the utilization of the radio resources. If the matter is taken into consideration, an alternative embodiment is possible in which the neighboring base station B having a small service area provides the multicasting service while the base station A having a large, inclusive service area does not provide the multicasting service.

Figure 6:
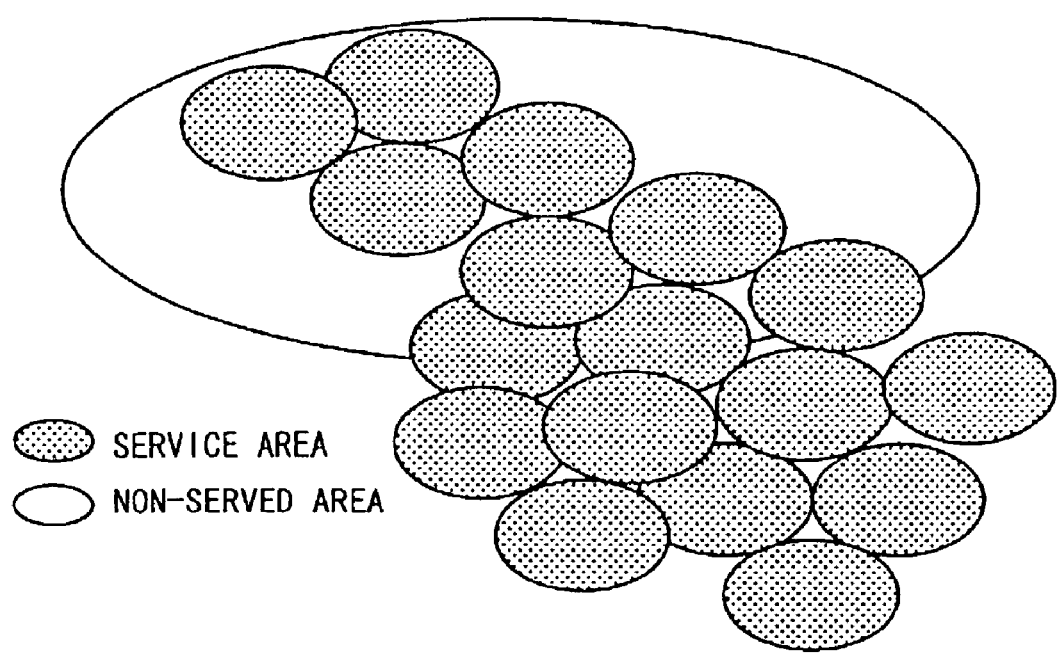
FIG. 6 is a diagram for explaining the case in which wireless base stations having small service areas provide the multicasting services.
Figure 7:
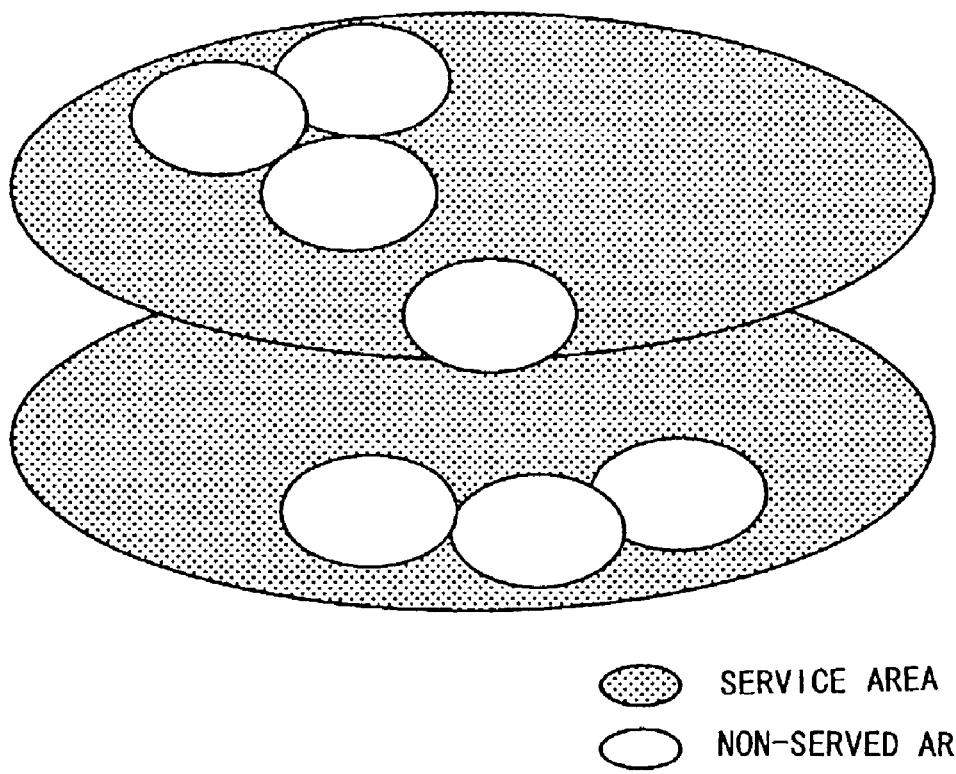
FIG. 7 is a diagram for explaining the case in which wireless base stations having large service areas provide the multicasting services.

FIG. 6 is a diagram for explaining the case in which wireless base stations having small service areas provide the multicasting services. FIG. 7 is a diagram for explaining the case in which wireless base stations having large service areas provide the multicasting services.

In the case of FIG. 6, the base stations having the small service areas cover a large service area. A wireless base station having the large service area is installed when the necessity arises, in order to avoid the congestion. In the present case, the base stations having the small service areas provide their multicasting services so as to cover the large service area. The wireless base station having the large service area does not provide the multicasting service. According to the present embodiment, it is possible to avoid the redundancy of the multicasting service provided for the overlapping service area.

Conversely to the case of FIG. 6, in the case of FIG. 7, the base stations having the large service areas cover a wide-range service area. Wireless base stations having small service areas are installed when the necessity arises, in order to avoid the congestion. In the present case, the base stations having the large service areas provide their multicasting services so as to cover the wide-range service area. The wireless base stations having the small service areas do not provide their multicasting services. According to the present embodiment, it is possible to avoid the redundancy of the multicasting service provided for the overlapping service area.

Next, a description will be given of the method of determining whether the wireless base station provides the multicasting service, based on the service states of the neighboring wireless base stations.

Figure 8:
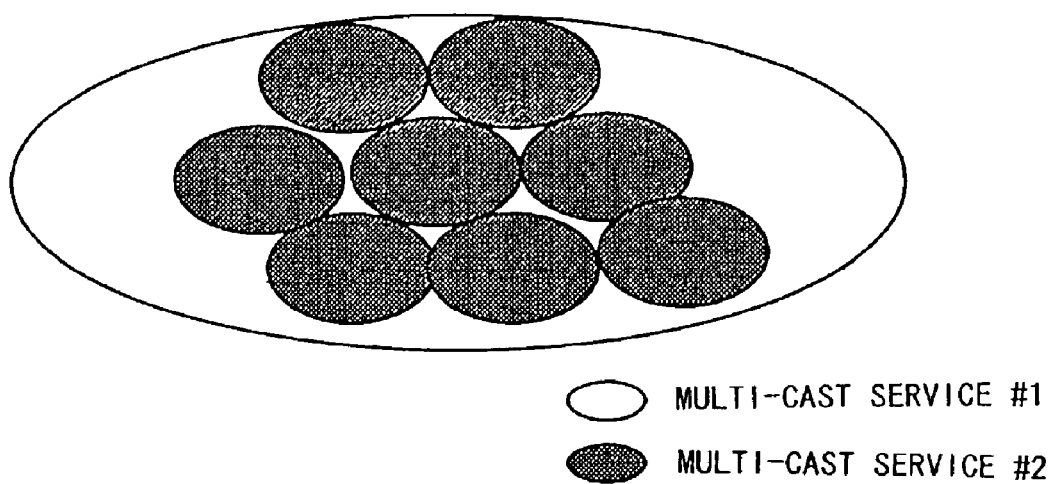
FIG. 8 is a diagram for explaining the case in which the wireless base station provides the multicasting service based on the service states of the neighboring wireless base stations.

FIG. 8 shows the case in which the wireless base station provides the multicasting service based on the service states of the neighboring wireless base stations.

As shown in FIG. 8, the multicasting service #1 is provided by the wireless base station having the large service area, while the multicasting service #2 is provided by each of the wireless base stations having the small service areas. The load of the radio resources used for the multicasting is controlled. In the present embodiment, the radio resources used for the multicasting are distributed, and it is possible to increase the utilization of the radio resources used for the multicasting.

The method of collection of the service states of the neighboring base stations will be described later. In the present embodiment, the wireless base station determines whether it provides the multicasting service, based on the service states of the neighboring base stations According to the present embodiment, it is possible to avoid the redundancy of the multicasting service provided for the overlapping service area. A different service other than the multicasting service can be provided for the overlapping service area.

The base stations which already provide the services are excluded, and the different service may be provided so as to meet the demands of the wireless terminals The detection of the overlapping service area may be performed according to the previous embodiment of FIG. 5.

In applications which perform the multicasting to a restricted local area, the multicasting information is effective only in the restricted local area. In such a case, the multicasting service is provided by only the wireless base stations which are located near the information source. For this reason, the determination as to whether the wireless base station provides the multicasting service may be made based on a hop number of the wireless base station in a wired or wireless communication network. When the hop number is used, the present embodiment is more useful in a wired communication network than a wireless communication network.

In the present embodiment, the hop number is defined for a wireless communication network as follows. The hop number 1 is allocated for a wireless base station located nearest to the information source, the hop number 2 is allocated for a wireless base station neighboring the nearest base station, the hop number 3 is allocated for a wireless base station neighboring the second nearest base station, and so on. As far as the hop number is concerned, the wireless base stations correspond to the routers in the IP (Internet protocol) network.

For example, suppose that a wireless base station located near the information source has the hop number 3. When the base station transmits control information, including the hop number 3, to a neighboring wireless base station, the received hop number is decremented to 2 at the neighboring base station. Further, when the neighboring base station transmits control information, including the hop number 2, to a next neighboring base station, the received hop number is decremented to 1 at the next neighboring base station. The same procedure is repeated. If the hop number that is equal to 0 is received at a wireless base station, the wireless base station determines that it does not provide the multicasting service. If the hop number that ranges from 1 to 3 is received at a wireless base station, the wireless base station determines that it provides the multicasting service.

In the wireless communication network, the hop numbers of the wireless base stations are managed for each of a plurality of multicast groups. According to the present embodiment, the multicasting service is provided for a restricted local area in accordance with each of the above-mentioned applications.

To realize the above-described embodiment, the wireless base station collects the service states of the neighboring wireless base stations, each service state including the hop number. The method of collection of the service states of the neighboring wireless base stations will now be explained.

Figure 9:
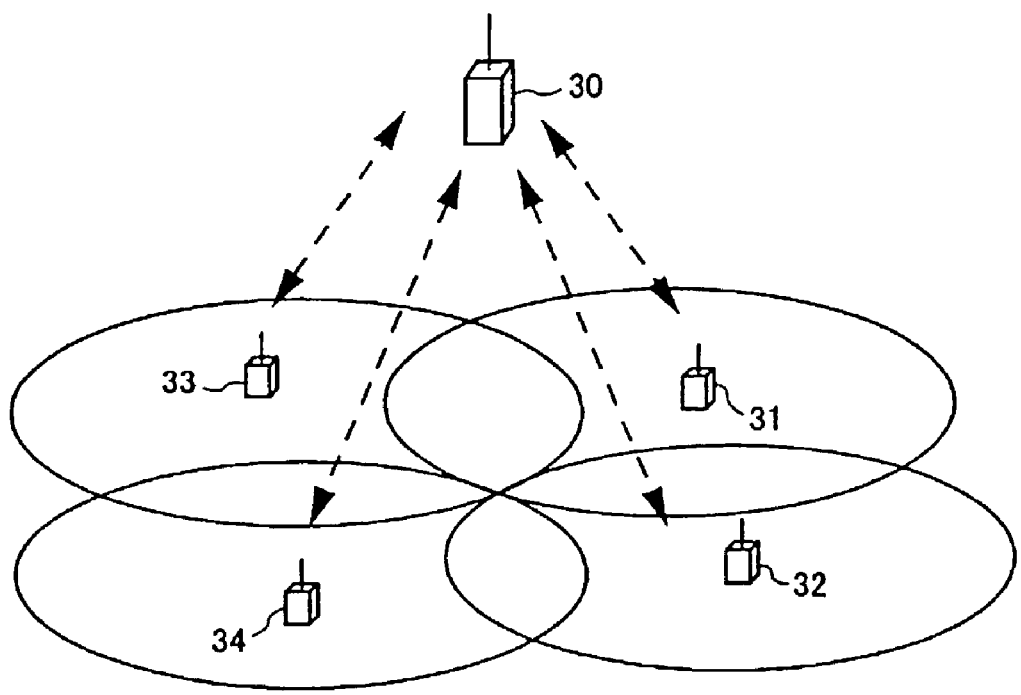
FIG. 9 is a diagram for explaining the collection of the service state data of the neighboring wireless base stations performed by the wireless base station.
Figure 10:
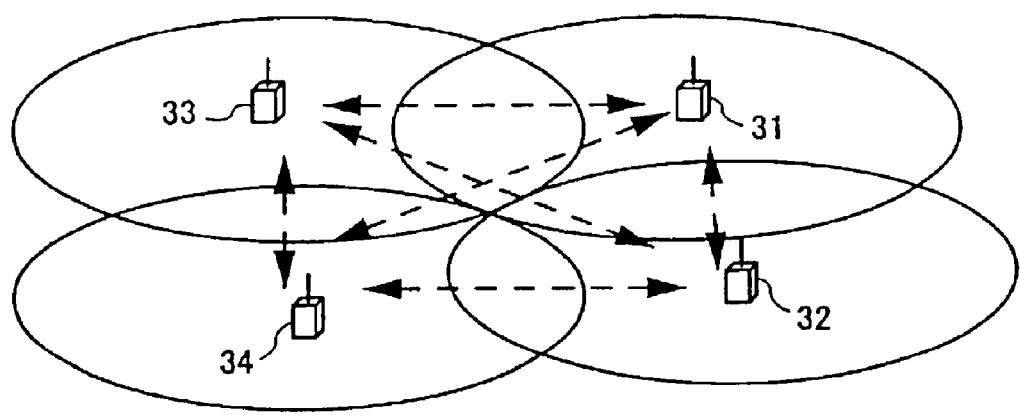
FIG. 10 is a diagram for explaining the collection of the service state data of the neighboring wireless base stations performed through the communication between the neighboring wireless base stations.

FIG. 9 shows the collection of the service state data of the neighboring wireless base stations performed by the wireless base station. FIG. 10 shows the collection of the service state data of the neighboring wireless base stations performed through the communication between the neighboring wireless base stations.

As shown in FIG. 9, wireless base stations 31, 32, 33 and 34 are connected to a control station 30, and each base station is capable of transmitting control information to and receiving control information from the control station 30. As described earlier, in the present example, each of the base stations 31–34 transmits the control information, including the multicast-related data of the base station, to the control station 30, and one of the base stations 31–34 receives the control information, including the service state data of the neighboring base stations, from the control station 30.

The above-described method is applicable to not only the wireless communication network but also the wired communication network. In alternative embodiment, the control station may transmit total multicast instructions or individual multicast group instructions to the neighboring wireless base stations, so that each base station determines whether it provides the multicasting service, based on the instructions received from the control station.

As shown in FIG. 10, in the present embodiment, each of the neighboring base stations receives the control information through the communication between the neighboring base stations, instead of the communication with the control station. The method of collection of the service state data of the neighboring wireless base stations in the present embodiment is also applicable to not only the wireless communication network but also the wired communication network.

All of the wireless base stations transmit the control information by using a certain channel related to the neighboring base station, and the neighboring base station may receive the required control information from the required base station so as to carry out the above-described method.

The wireless base station transmits the service state data, related to the multicasting service of the wireless base station itself, to the neighboring base station, and the neighboring base station may determine whether it provides the multicasting service, based on the received service state data. The wireless terminal which receives the multicasting service can receive the service state data of a wireless base station connectable to the terminal by using a control channel or a certain channel. If the wireless terminal sends the service state data of the connectable base station to the currently connected base station, the currently connected base station may determine whether it provides the multicasting service, based on the received service state data.

Figure 11:
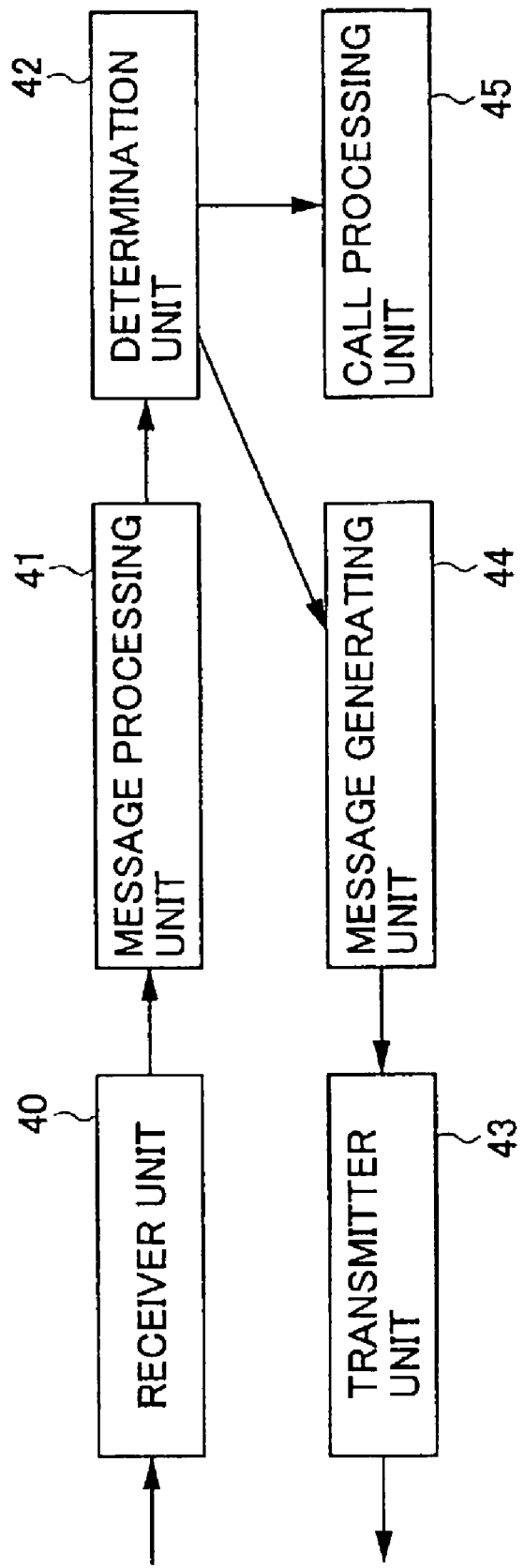

FIG. 11 shows a configuration of the wireless base station in the first preferred embodiment of the invention.

As shown in FIG. 11, in the present embodiment, a transmitter unit 43 transmits a first message, including control data of this base station, to a neighboring wireless base station, and a receiver unit 40 receives a second message including control data of a neighboring wireless base station. A message processing unit 41 extracts a multicast-related control data from the second message received by the receiver unit 40. The message processing unit 41 sends the extracted multicast-related control data to a determination unit 42. The determination unit 42 determines whether the base station provides the multicasting service, based on the extracted multicast-related control data from the message processing unit 41. In a certain case, the determination unit 42 may determine that the base station does not provide the multicasting service. The determination unit 42 sends the result of the determination to a call processing unit 45. When a request from a calling wireless terminal is received, the call processing unit 45 transmits the result of the determination to the calling wireless terminal. Further, the determination unit 42 sends the result of the determination to a message generating unit 44. The message generating unit 44 generates the first message that is indicative of the result of the determination by the determination unit 42, and sends the first message to the transmitter unit 43 so that the transmitter unit 43 transmits the first message to the neighboring base station.

In the present embodiment, the transmission and receiving of the control data may be performed by the wireless base station at the time of power-on or periodically at the intervals of a certain period. Each time a new control data of the neighboring wireless base station is received, the message generating unit 44 and the call processing unit 45 are notified of the new control data.

In the present embodiment, when the neighboring base station provides the multicasting service for the multicasting group, the determination unit 42 may determine that the wireless base station of concern does not provide the multicasting service for the multicasting group.

In the present embodiment, the wireless base station may control the multicast-related control data (such as the in-service state, the service disable state or the service enable state) for each of the multicasting service types, and may transmit the multicast-related control data to the neighboring wireless base station or the control station.

According to the present embodiment, the wireless base station collects the service states of the neighboring base stations from the control station or the neighboring base stations, and determines whether the wireless base station provides the multicasting service, based on the service states of the neighboring base stations. It is possible to avoid the redundancy of the multicasting service provided for the overlapping service area. It is possible for the wireless base station of the present embodiment to make efficient use of the radio resources and lower the maintenance and operation costs.

Next, a description will be given of a second preferred embodiment of the invention.

Figure 12:
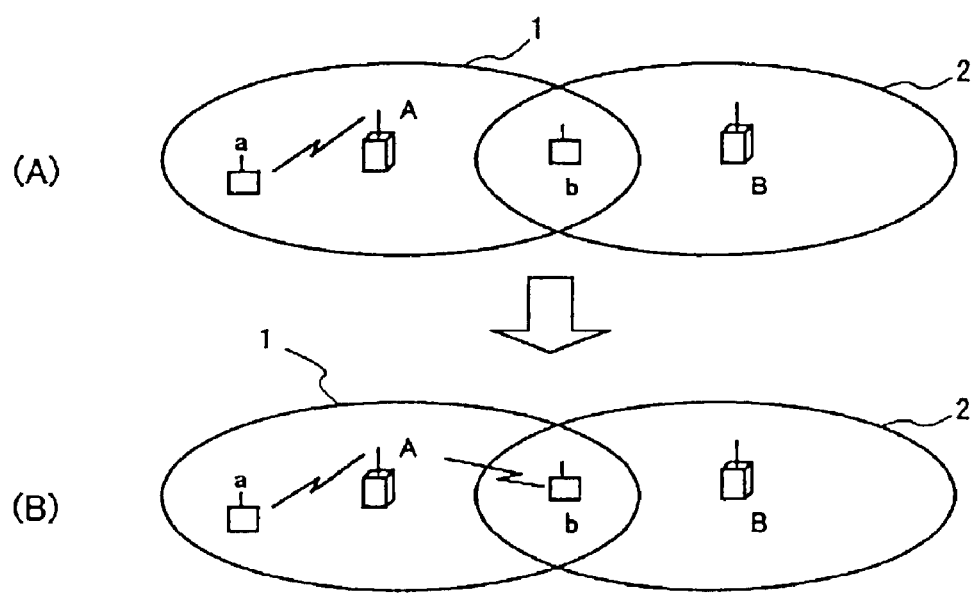
FIG. 12 is a diagram for explaining joining of a wireless terminal to the multicasting service.

FIG. 12 is a diagram for explaining joining of a wireless terminal to the multicasting service. In FIG. 12, reference numeral 1 denotes the service area of the wireless base station A, and reference numeral 2 denotes the service area of the wireless base station B.

FIG. 12(A) indicates the state before the wireless terminal "b" joins the multicasting service provided by the base station A, and FIG. 12(B) indicates the state after the wireless terminal "b" joins the multicasting service provided by the base station A according to the present embodiment.

Initially, the wireless terminal "a" is connected to the base station A to receive the multicasting service from the base station A as the multicast group G1. As indicated in FIG. 12, in such a state, the wireless terminal "b" is about to join the multicast group G1. Suppose that the wireless terminal "b" exists at the location where the terminal "b" is connectable to both the base station A and the base station B.

In the above-described state, the wireless terminal "b" according to the present embodiment detects that the base station A is now providing the multicasting service for the multicast group G1, by using a certain channel related to the neighboring base station. The wireless terminal "b" selects the base station A which is now providing the multicasting service, and receives the multicasting service provided by the base station A, as indicated in FIG. 12(B).

According to the present embodiment, it is no longer required that the base station B transmits identical multicasting information to the multicast group G1. Hence, the base station B stops providing the multicasting service for the multicast group G1, and it is possible to allocate the radio sources of the base station B to other services.

Figure 13:
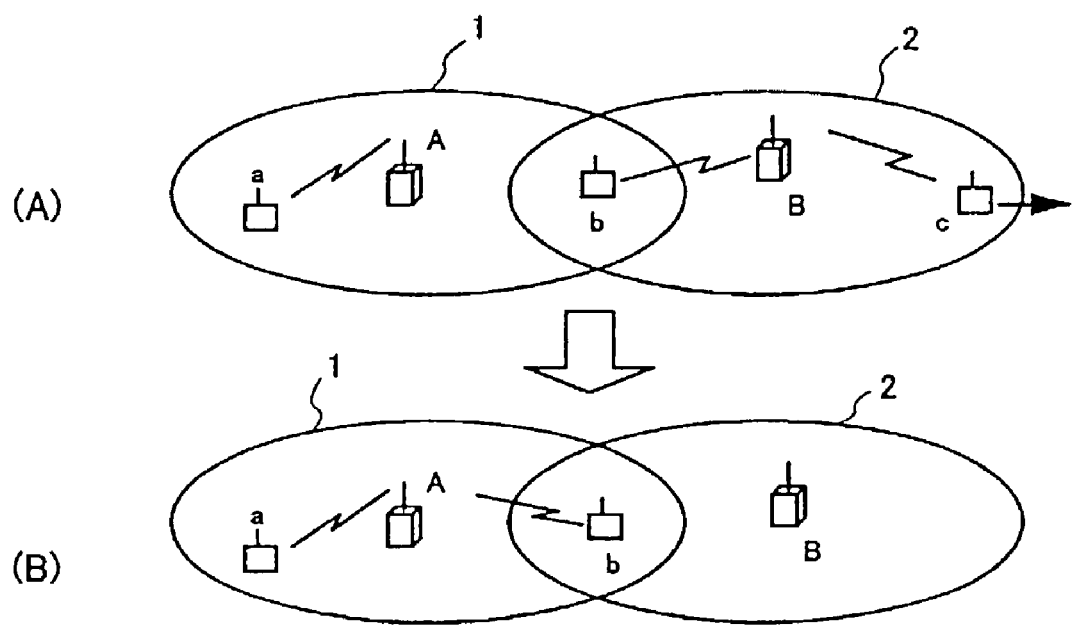
FIG. 13 is a diagram for explaining switching of the connection of a wireless base station during the multicasting service.

FIG. 13 is a diagram for explaining switching of the connection of a wireless base station during the multicasting service. In FIG. 13, reference numeral 1 denotes the service area of the wireless base station A, and reference numeral 2 denotes the service area of the wireless base station B.

FIG. 13(A) indicates the state before the connection of the wireless terminal "b" is switched, and FIG. 13(B) indicates the state after the connection of the wireless terminal "b" is switched according to the present embodiment.

Initially, as indicated in FIG. 13(A), the wireless terminal "a" is connected to the base station A, and the wireless terminals "b" and "c" are connected to the base station B. Suppose that each of the wireless terminals "a", "b" and "c" receives identical multicasting information of the multicast group G1.

In the above-described state, the terminal "c" moves away from the service area of the base station B. In such a case, only the terminal "b" in the service area of the base station B receives identical multicasting information of the multicast group G1. However, the wireless terminal "b" exists at the location where the terminal "b" is connectable to both the base station A and the base station B. The wireless terminal "b" according to the present embodiment detects that the base station A is now providing the multicasting service for the multicast group G1, by using a certain channel related to the neighboring base station. The wireless terminal "b" selects the base station A which is now providing the multicasting service, and receives the multicasting service provided by the base station A, as indicated in FIG. 13(B).

According to the present embodiment, it is no longer required that the base station B transmits identical multicasting information to the multicast group G1. Hence, the base station B stops providing the multicasting service for the multicast group G1, and it is possible to allocate the radio sources of the base station B to other services.

Figure 14:
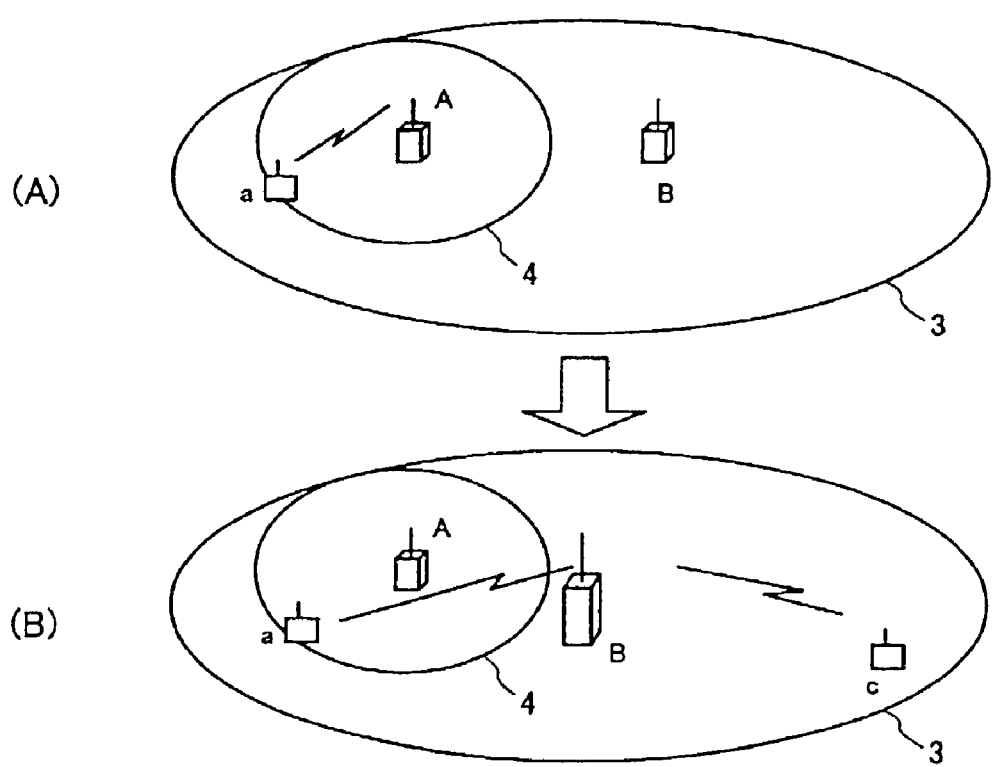
FIG. 14 is a diagram for explaining multicasting service processing for the overlapping service area.

FIG. 14 is a diagram for explaining multicasting service processing for the overlapping service area. In FIG. 14, reference numeral 3 denotes the service area of the wireless base station B, reference numeral 4 denotes the service area of the wireless base station A, and the service area 4 of the base station A is provided within the service area 3 of the base station B.

FIG. 14(A) indicates the state before the connection of the wireless terminal "a" is switched, and FIG. 14(B) indicates the state after the connection of the wireless terminal "a" is switched according to the present embodiment.

Initially, as indicated in FIG. 14(A), the wireless terminal "a" is connected to the base station A, and the wireless terminal "a" receives the multicasting service of the multicast group GI provided by the base station A.

In the above-described state, the terminal "c" is newly connected to the base station B and joins the multicast group G1. In such a case, both the base station A and the base station B transmit identical multicasting information of the multicast group G1. However, the wireless terminal "a" exists at the location where the terminal "a" is connectable to both the base station A and the base station B. The wireless terminal "a" according to the present embodiment detects that the base station B is now providing the multicasting service for the multicast group G1, by using a certain channel related to the neighboring base station.

Further, the wireless terminal "a" detects the number of wireless terminals currently connected to the base station A (for the multicast group G1) by using a certain channel related to the base station A, and detects the number of wireless terminals currently connected to the base station B (for the multicast group G1) by using a certain channel related to the base station B. It is determined at the wireless terminal "a" whether the latter number is larger than the former number. The wireless terminal "a" according to the present embodiment selects one of connection of the terminal "a" to the base station A and disconnection of the terminal "a" from the base station A based on the result of the determination, so as to make the number of wireless base stations that send identical multicasting information as small as possible.

In the present example, the wireless terminal "a" selects disconnection of the terminal "a" from the base station A, and receives the multicasting service provided by the base station B, as indicated in FIG. 14(B).

Next, the notification of the number of the currently connected wireless terminals which is sent from the wireless base station to a wireless terminal for each multicast group will now be explained.

It is necessary for the wireless base station to detect that a certain wireless terminal terminates the receiving of the multicasting service of that base station, or that only one wireless terminal is left in the service area of that base station. It is necessary for the wireless terminal to detect that the terminal solely receives the multicasting service from the wireless base station.

To resolve the above problems, when the wireless terminal is about to receive the multicasting service of the wireless base station, the wireless terminal sends a join message to the base station. In addition, when the wireless terminal is about to leave from the multicasting service of the wireless base station, the wireless terminal sends a leave message to the base station. Each time the join or leave message is received at the base station, the count value, indicating the number of wireless terminals currently connected to the base station for each multicast group, is incremented or decremented. A broadcast message, including the resulting count value, is transmitted from the base station to the wireless terminal by using a certain channel related to the neighboring base station.

In the above-described embodiment in FIG. 14, by receiving the broadcast message from the base station, the wireless terminal switches the connection of the wireless terminal to a new base station, so as to make the number of wireless base stations that send identical multicasting information as small as possible. When it is detected that there is no wireless terminal receiving the multicasting service, the base station stops providing the multicasting service.

Figure 15:
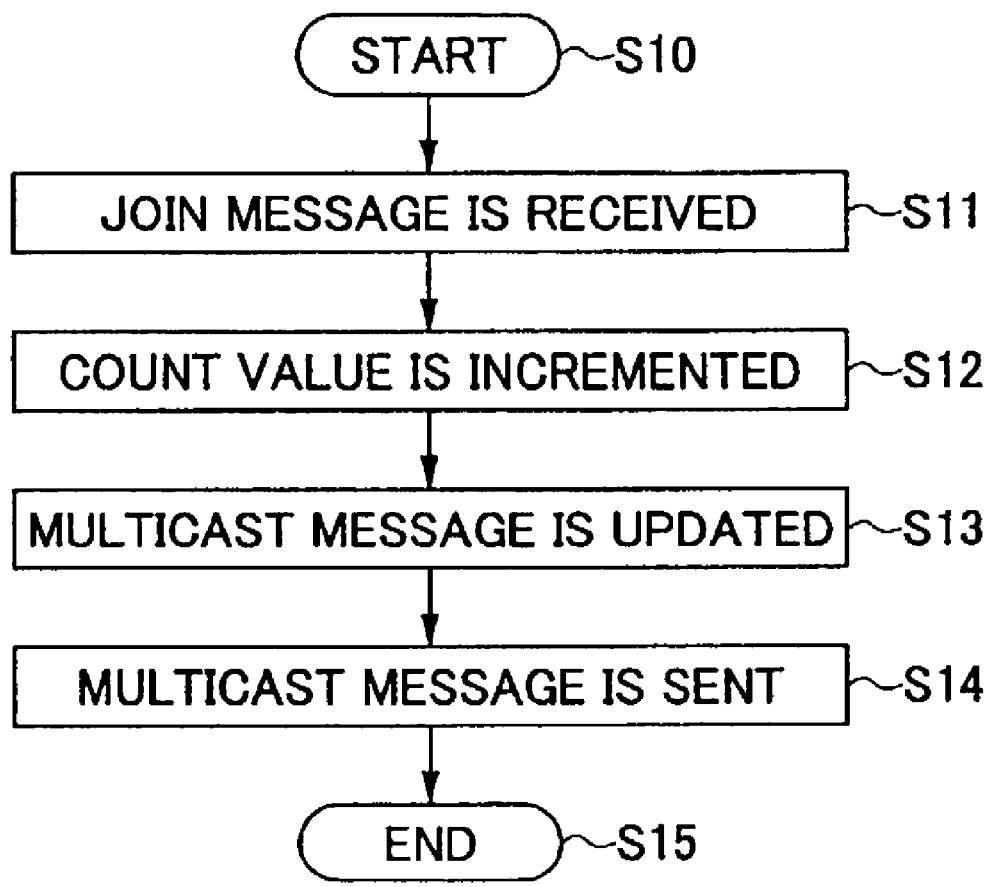
FIG. 15 is a flowchart for explaining a control process performed by the wireless base station when a join message from the wireless terminal is received.

FIG. 15 shows a control process performed by the wireless base station of the present embodiment when a join message from the wireless terminal is received.

As shown in FIG. 15, when the wireless terminal is about to receive the multicasting service of the wireless base station, the wireless terminal sends a join message to the base station. At a start of the control process, the base station receives the join message from the terminal (S11). After the step S11 is performed, the base station increments the count value of the internal counter based on the received join message (S12). At the same time, the base station updates the number of the currently connected wireless terminals in a broadcast message to be transmitted (S13). After the step S13 is performed, the base station transmits the broadcast message (S14).

Figure 16:
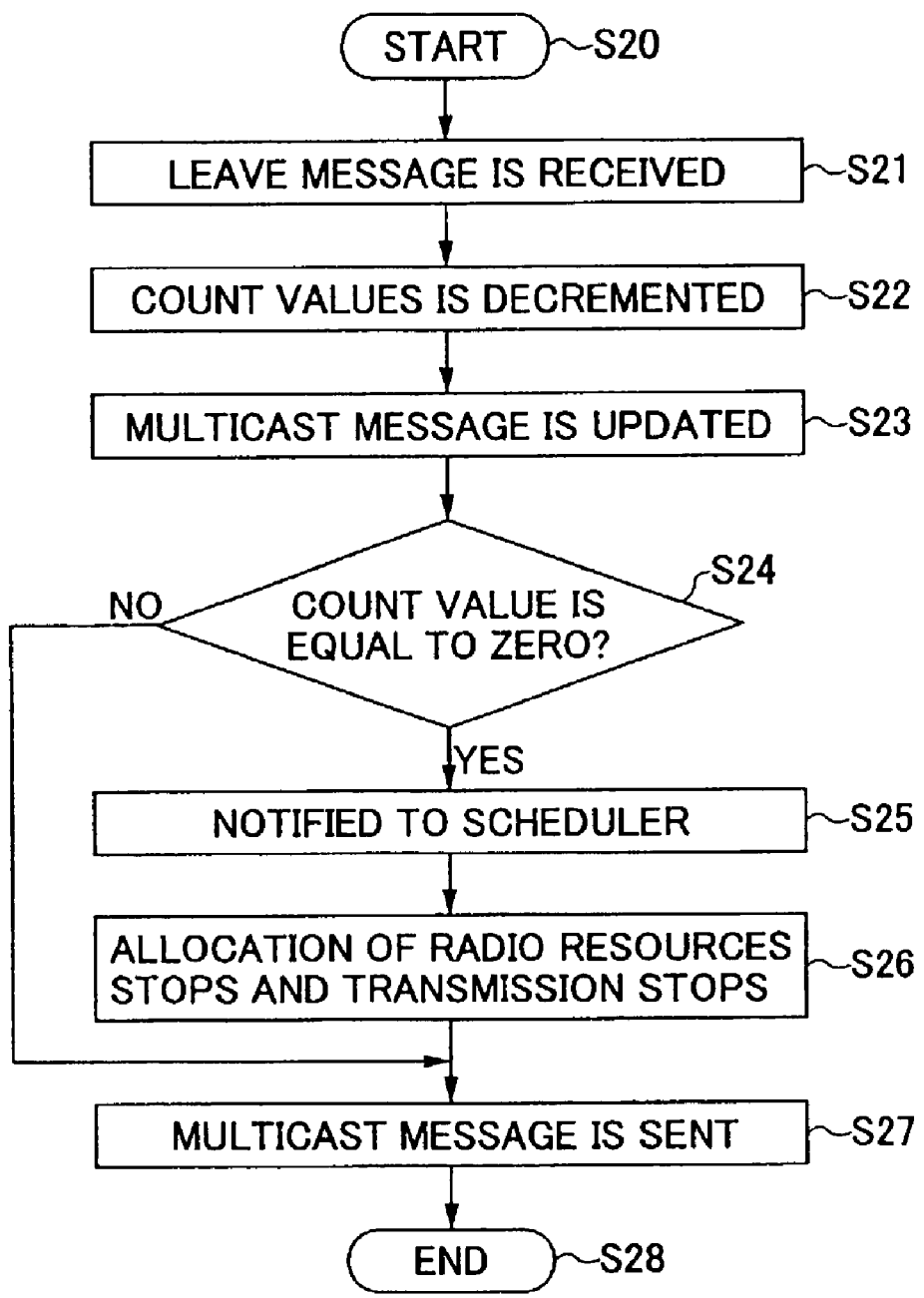
FIG. 16 is a flowchart for explaining a control process performed by the wireless base station when a leave message from the wireless terminal is received.

FIG. 16 shows a control process performed by the wireless base station of the present embodiment when a leave message from the wireless terminal is received.

As shown in FIG. 16, when the wireless terminal is about to leave the multicasting service of the wireless base station, the wireless terminal sends a leave message to the base station. At a start of the control process, the base station receives the leave message from the terminal (S21). After the step S21 is performed, the base station decrements the count value of the internal counter based on the received leave message (S22). At the same time, the base station updates the number of the currently connected wireless terminals in a broadcast message to be transmitted (S23).

After the step S13 is performed, the base station determines whether the resulting count value is equal to 0 (S24). When the count value is equal to 0, it indicates that there is no wireless terminal receiving the multicasting service. The base station notifies the radio resource scheduler that there is no wireless terminal receiving the multicasting service (S25). The base station causes the scheduler to stop the allocation of the radio resources for the multicasting service, and causes the transmitter unit to stop transmitting the multicasting service information (S26). After the step S26 is performed, the control of the base station is transferred to next step S27.

When the count value is not equal to 0 at the step S24, the base station transmits the broadcast message including the resulting count value (S27).

Figure 17:
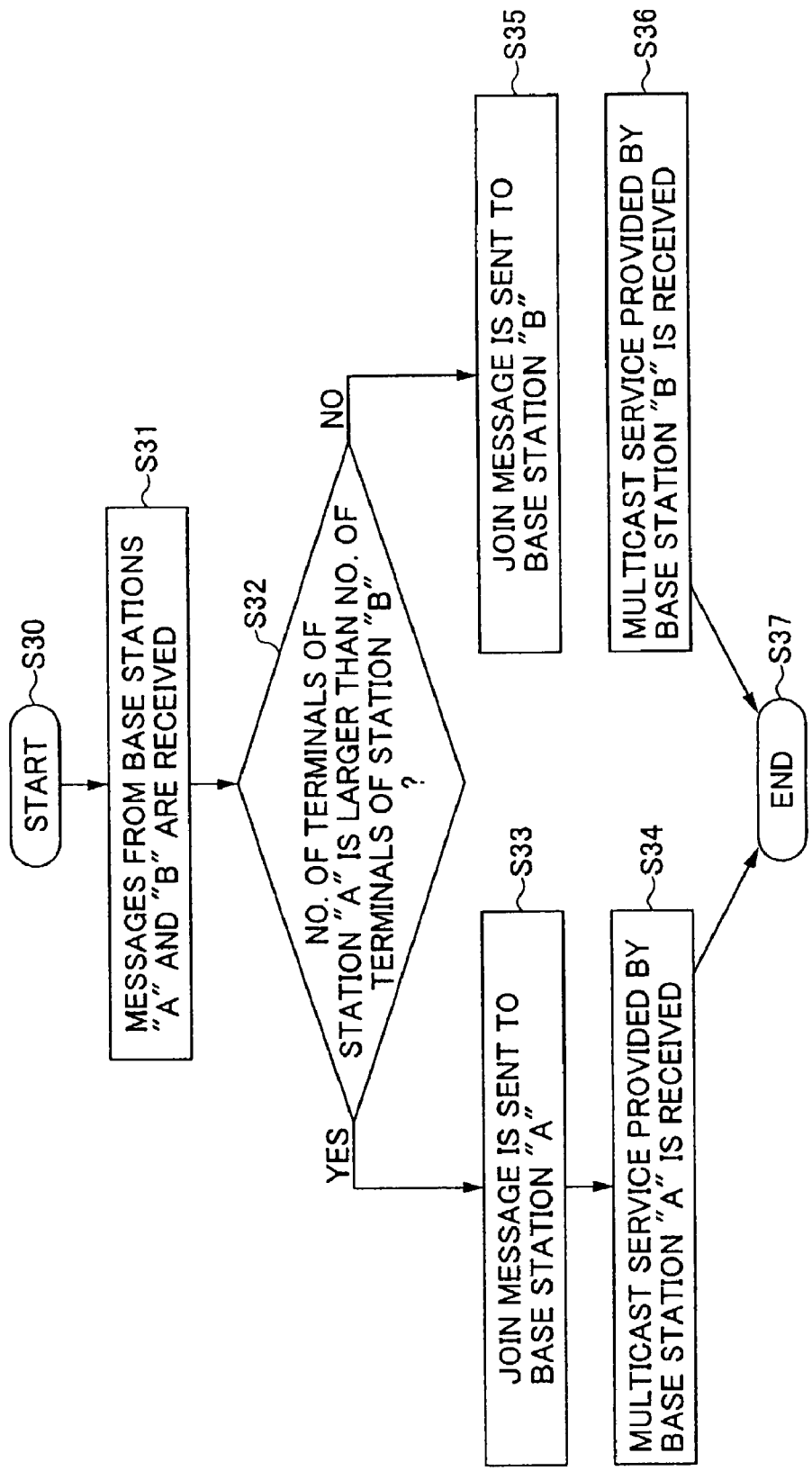
FIG. 17 is a flowchart for explaining a control process performed by the wireless terminal when sending a join message to a wireless base station to join a multicasting service group.

FIG. 17 shows a control process performed by the wireless terminal of the present embodiment when sending a join message to a wireless base station to join a multicast group.

As shown in FIG. 17, when the wireless terminal intends to join the multicast group, the wireless terminal receives the broadcast messages from the neighboring base stations A and B (S31). After the step S31 is performed, the wireless terminal detects the number of wireless terminals currently connected to the base station A for the intended multicast group from the broadcast message from the base station A, and detects the number of wireless terminals currently connected to the base station B for the intended multicast group from the broadcast message from the base station B. If there is no information related to the intended multicast group, it is determined that the number of wireless terminals currently connected to the base station is equal to 0. The wireless terminal determines whether the former number is larger than the latter number (S32).

When the result at the step S32 is affirmative, the wireless terminal sends a join message to the base station A (S33). The wireless terminal receives the multicasting service provided by the base station A (S34). On the other hand, when the result at the step S32 is negative, the wireless terminal sends a join message to the base station B (S35). The wireless terminal receives the multicasting service provided by the base station B (S36). After one of the steps S34 and S36 is performed, the control process of FIG. 17 ends.

Figure 18:
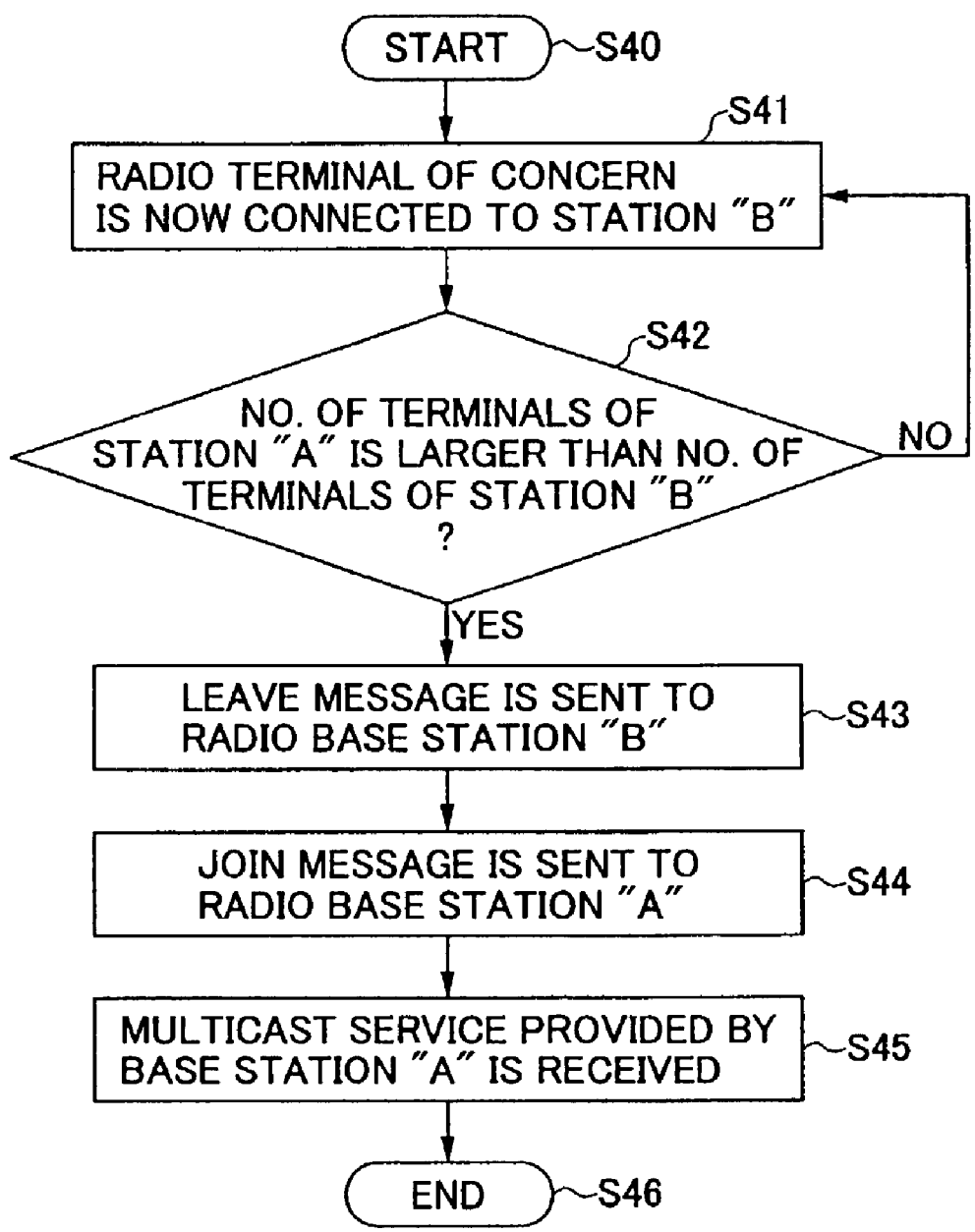
FIG. 18 is a flowchart for explaining a control process performed by the wireless terminal-when the connection of the wireless terminal is switched.

FIG. 18 shows a control process performed by the wireless terminal when the connection of the wireless terminal is switched.

In the present embodiment, the wireless terminal has been connected to the base station B to receive the service from the base station B, and the connection of the wireless terminal is switched to the wireless base station A.

As shown in FIG. 18, at a start of the control process (S40), the wireless terminal is now connected to the base station B (S41). The wireless terminal intermittently receives broadcast messages from the neighboring wireless base stations. The wireless terminal is connectable to the base stations A and B. By using a certain channel related to the neighboring wireless base stations, the wireless terminal receives the service states of the base stations A and B, and detects the number of wireless terminals connected to the base station A and the number of wireless terminals connected to the base station B from the received service states of the base stations A and B. The wireless terminal determines whether the number of the terminals of the base station A is larger than the number of the terminals of the base station B (S42).

When the result at the step S42 is affirmative, the wireless terminal sends a leave message to the base station B (S43). After the step S43 is performed, the wireless terminal sends a join message to the base station A (S44). After the step S44 is performed, the connection of the wireless terminal is switched to the base station A, and the wireless terminal joins the multicast group of the base station A and receives the multicasting service provided by the base station A (S45).

When the result at the step S42 is negative, the control of the wireless terminal is transferred to the step S41. The switching of the connection of the wireless terminal to the base station A is not performed in this case.

When the wireless terminal only leaves from the multicasting group, it is adequate that the wireless terminal sends the leave message to the base station B.

Figure 19:
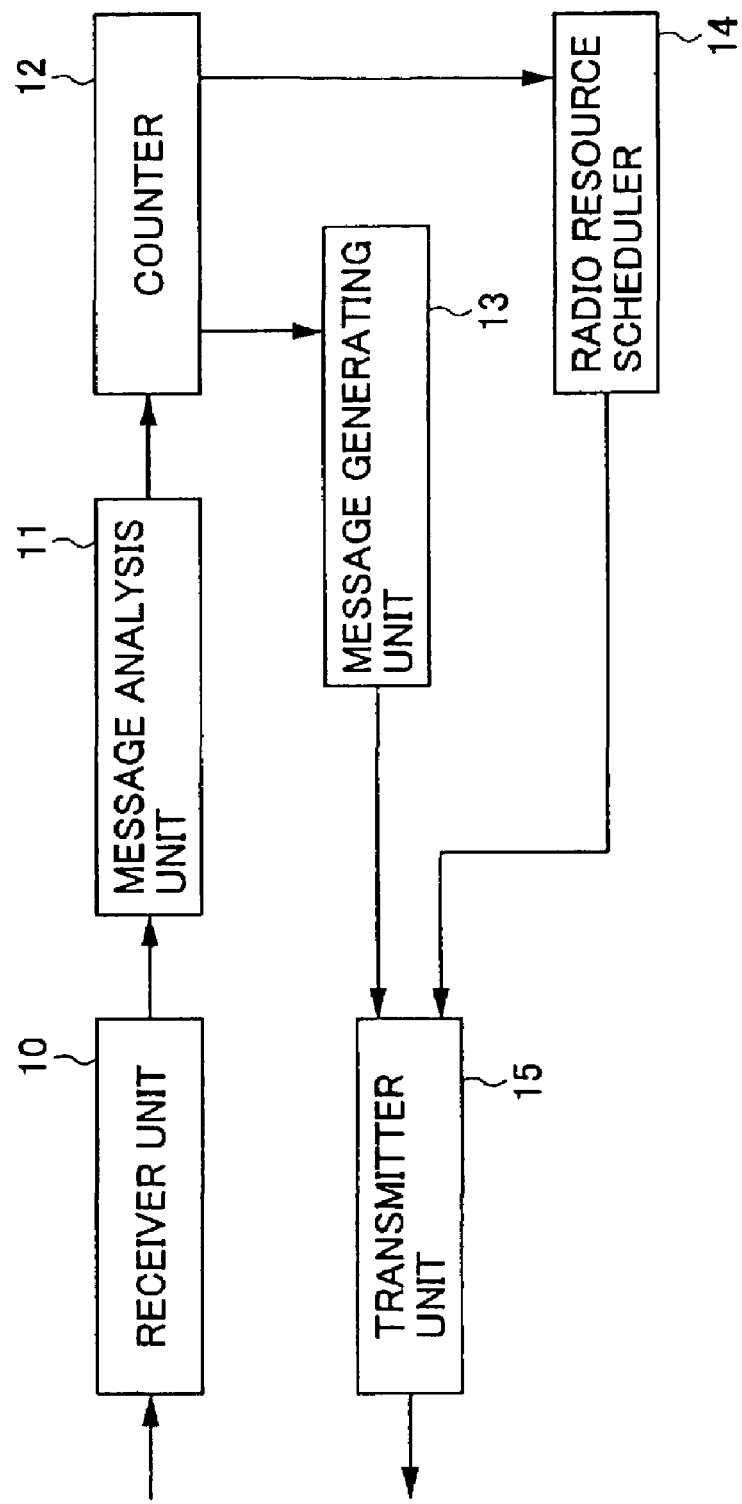
FIG. 19 is a block diagram of a wireless base station in a second preferred embodiment of the invention.

FIG. 19 shows a wireless base station in a second preferred embodiment of the invention.

As shown in FIG. 19, in the wireless base station of the present embodiment, a receiver unit 10 receives control data, including a join message or a leave message, in addition to communication data. A message analysis unit 11 extracts the join/leave message from the control data received by the receiver unit 10, and sends the extracted message to a counter 12. In the counter 12, a count value is incremented or decremented, or remain unchanged, in accordance with the extracted message from the message analysis unit 11. When the count value of the counter 12 is changed, the counter 12 notifies a message generating unit 13 of the changed count value. The message generating unit 13 generates a broadcast message based on the changed count value, and sends the broadcast message to a transmitter unit 15 so that the transmitter unit 15 transmits the broadcast message.

When the count value of the counter 12 is equal to zero, the counter 12 notifies a radio resource scheduler 14. The resource scheduler 14 in this case stops the allocation of the radio resources to the wireless terminals. When a join message from the wireless terminal to join a new multicasting group is received, the count value of the counter 12 is changed from 0 to 1. The counter 12 notifies the resource scheduler 14 of the new join message. The resource scheduler 14 allocates the radio resources to the new multicasting group. In this case, the transmitter unit 15 transmits the multicasting information related to the new multicasting group.

Figure 20:
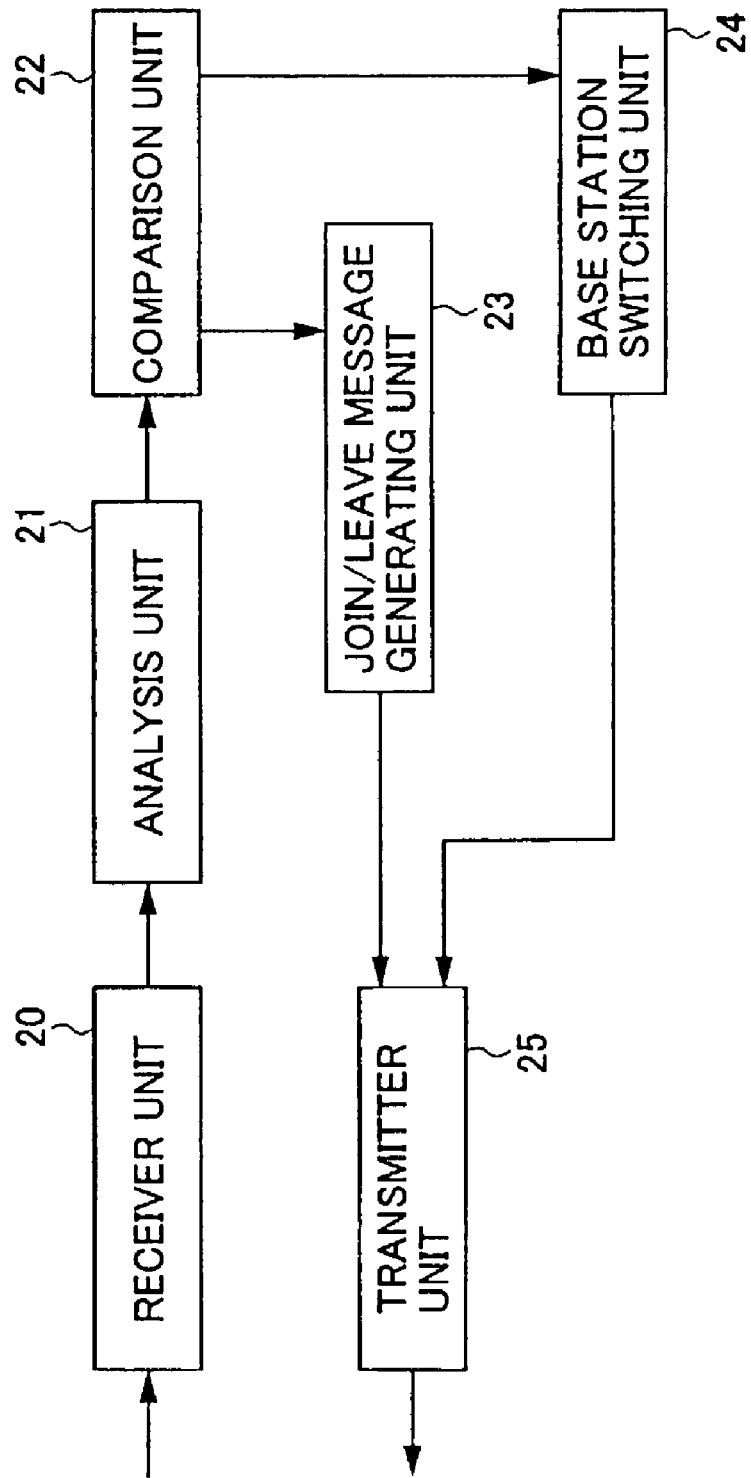
FIG. 20 is a block diagram of a wireless terminal in the second preferred embodiment of the invention.

FIG. 20 shows a wireless terminal in the second preferred embodiment of the invention.

As shown in FIG. 20, in the wireless terminal of the present embodiment, a receiver unit 20 receives control data, including a broadcast message, in addition to communication data. A message analysis unit 21 extracts the broadcast message from the control data received by the receiver unit 20, determines the number of wireless terminals connected to the multicast group from the extracted message, and sends the number of wireless terminals to a comparison unit 22. The comparison unit 22 determines whether the received number is larger than the number of wireless terminals currently connected to the base station. When the number of wireless terminals connected to the multicast group is larger than the number of wireless terminals currently connected to the base station, the switching of the connection of the wireless terminal of concern is needed. In this case, a join/leave message generating unit 23 and a base station switching unit 24 are notified of the need for the switching. Otherwise, no further processing is performed.

The message generating unit 23 generates a leave message to the current base station and a join message to a new base station based on the result of the determination received from the comparison unit 22. The message generating unit 23 sends the join/leave messages to a transmitter unit 25 so that the transmitter unit 25 transmits the messages. The base station switching unit 24 controls the synchronization of the transmitter unit 25 with the current base station (or the new base station) in accordance with the result of the determination received from the comparison unit 22.

The present invention is not limited to the above-described embodiments, and variations and modifications may be made without departing from the scope of the present invention.

What is claimed is:

1. A wireless base station which is connected to a plurality of wireless terminals and provides a multicasting service for the plurality of wireless terminals, the wireless base station comprising:
   a transmitter unit configured to transmit a first message to neighboring wireless base stations;
   a receiver unit configured to receive a second message from the neighboring wireless base stations;
   a message processing unit configured to extract a multicast-related control data from the second message received by the receiver unit, the multicast-related control data indicating multicasting service states of the neighboring wireless base stations;
   a determination unit configured to determine whether the wireless base station provides the multicasting service for the plurality of wireless terminals, based on the multicasting service states of the neighboring base stations indicated by the multicast-related control data; and
   a message generating unit configured to generate the first message that is indicative of a determination result by the determination unit, and sending the first message to the transmitter unit so that the transmitter unit transmits the first message,
   wherein the wireless base station determines autonomously whether the wireless base station provides the multicasting service for the plurality of wireless terminals.

2. The wireless base station as claimed in claim 1, characterized in that the determination as to whether the wireless base station provides the multicasting service is made for each of a plurality of multicasting service groups.

3. The wireless base station as claimed in claim 1, characterized in that the determination as to whether the wireless base station provides the multicasting service is made based on a magnitude of a service area in which the wireless base station can provide the multicasting service for the plurality of wireless terminals.

4. The wireless base station as claimed in claim 1, characterized in that the determination as to whether the wireless base station provides the multicasting service is made based on whether the wireless base station has an overlapping service area.

5. The wireless base station as claimed in claim 1, characterized in that the determination as to whether the wireless base station provides the multicasting service is made based on a service state of a neighboring wireless base station.

6. The wireless base station as claimed in claim 5, characterized in that each of the wireless terminals which are connected to the neighboring wireless base station sends a state signal indicating a service state of one of the neighboring wireless base stations.

7. The wireless base station as claimed in claim 1, characterized in that the determination as to whether the wireless base station provides the multicasting service is made based on a hop number of the wireless base station.

8. The wireless base station as claimed in claim 1, further comprising:
   means for transmitting a first state signal to at least one of the neighboring wireless base stations, the first state signal indicating a multicasting service state of the wireless base station; and
   means for receiving a second state signal from the at least one of the neighboring wireless base stations, the second state signal indicating a multicasting service state of the at least one of the neighboring wireless base stations.

9. A wireless base station which is connected to a control station and a plurality of wireless terminals and provides a multicasting service for the plurality of wireless terminals, characterized in the wireless base station comprising:
   a transmitting unit configured to transmit a first state signal to the control station, the first state signal indicating a multicasting service state of the wireless base station; and
   a receiving unit configured to receive a second state signal from the control station, the second state signal indicating multicasting service states of the neighboring wireless base stations,
   wherein the wireless base station determines whether the wireless base station provides the multicasting service, for the plurality of wireless terminals, based on the multicasting service states of the neighboring wireless base stations indicated by the second state signal.

10. A method of selecting a wireless base station for a wireless terminal, the wireless base station providing a multicasting service for the wireless terminal, comprising:
 detecting whether the wireless terminal can receive same multicasting information from a plurality of wireless base stations;
 determining a number of wireless terminals to which the same multicasting information is being transmitted by each of the plurality of wireless base stations; and
 selecting one of the plurality of wireless base stations based on the number of wireless terminals determined in the determining step, so as to make a number of the wireless base stations that transmit the same multicasting information as small as possible,
 wherein, when there is a first wireless base station that is connectable to the wireless terminal and transmitting the same multicasting information to the wireless terminal, the wireless terminal selects the first wireless base station and is connected to the first wireless base station.

11. The method as claimed in claim 10, characterized in that, when there are a plurality of first wireless base stations which are connectable to the wireless terminal and sending the same multicasting information to the wireless terminal, the wireless terminal selects one of the plurality of first wireless base stations such that the selected first wireless base station has a largest number of wireless terminals connected thereto, and the wireless terminal being connected to the selected first wireless base station.

12. The method as claimed in claim 10, characterized in that the selected wireless base station provides the multicasting service for the wireless terminal.

13. The wireless base station as claimed in claim 1 wherein, when a wireless terminal selects one of plurality of wireless base stations so as to make the number of the wireless base stations that send identical multicasting information as small as possible, the wireless base station determines that the wireless base station provides the multicasting service for the wireless terminal.

14. The wireless base station as claimed in claim 1, wherein the wireless base station further comprises a counter in which a count value is incremented when a join message from the wireless terminal is received at the wireless base station, and decremented when a leave message from the wireless terminal is received at the wireless base station, wherein the wireless base station transmits the count value of the counter to the wireless terminal.

15. The wireless base station as claimed in claim 14, characterized in that the wireless base station transmits a renewed count value of the counter to the wireless terminal each time the count value is renewed.

16. The wireless base station as claimed in claim 14, characterized in that the wireless base station stops providing the multicasting service for the wireless terminal when the count value of the counter is equal to zero.

17. A wireless terminal which receives a multicasting service provided by a wireless base station, characterized in comprising:
 an analysis unit determining the number of wireless terminals connected to a multicast group, based on a received control data; and a comparison unit determining whether the determined number is larger than the number of wireless terminals currently connected to the base station,
 wherein the wireless terminal selects one of connection of the wireless terminal to the base station and disconnection of the wireless terminal from the base station based on the result of the determination of the comparison unit, so as to make the number of wireless base stations that send identical multicasting information as small as possible.

* * * * *